United States Patent [19]

DiValentin et al.

[11] Patent Number: 5,416,699
[45] Date of Patent: May 16, 1995

[54] PROPELLER SPEED CONTROL HAVING CONTROL PARAMETERS BASED ON SYSTEM DYNAMIC CHARACTERISTICS

[75] Inventors: Eugenio DiValentin, Enfield; Roy W. Schneider, Ellington, both of Conn.

[73] Assignee: United Technologies Corporation, Hartford, Conn.

[21] Appl. No.: 977,938

[22] Filed: Nov. 18, 1992

[51] Int. Cl.$^6$ .............................................. B64C 11/50
[52] U.S. Cl. ........................... 364/424.01; 364/424.05; 364/431.01
[58] Field of Search ............... 416/35, 27; 364/424.01, 364/424.06, 431.05, 431.07, 431.01

[56] References Cited

U.S. PATENT DOCUMENTS

| | | | |
|---|---|---|---|
| 4,452,207 | 6/1984 | Moore, Jr. | 123/440 |
| 4,934,825 | 6/1990 | Martin | 364/431.01 |
| 4,993,919 | 2/1991 | Schneider | 416/35 |
| 5,005,354 | 4/1991 | Schneider | 60/39.281 |
| 5,017,089 | 5/1991 | Schneider et al. | 416/35 |
| 5,209,640 | 5/1993 | Moriya | 416/35 |
| 5,213,471 | 5/1993 | Miller et al. | 416/44 |

*Primary Examiner*—Kevin J. Teska
*Assistant Examiner*—Stephen J. Walder, Jr.
*Attorney, Agent, or Firm*—Richard H. Kosakowski

[57] ABSTRACT

An aircraft propeller speed control defines values for propeller speed governing control law parameters, such as gains and dynamic compensations, based on known values of propeller and engine dynamic characteristics over the complete propeller operating envelope. Adjusting control law gains and dynamic compensations as functions of propeller and engine dynamic characteristics over the entire flight envelope provides for control of propeller speed to obtain optimum stability and consistent propulsion performance over the entire flight envelope.

18 Claims, 3 Drawing Sheets

PROPELLER SPEED CONTROL HAVING CONTROL PARAMETERS BASED ON SYSTEM DYNAMIC CHARACTERISTICS

TECHNICAL FIELD

The invention relates to propeller speed controls, and more particularly, to a propeller speed control having control law parameters derived from known values of propeller and engine dynamic characteristics over the complete propeller operating envelope.

BACKGROUND ART

It is well known in the art of aircraft propeller speed controls to use mechanical control systems to control propeller speed. In these mechanical systems a value for a particular control law gain or dynamic compensation is selected which will provide the system with optimal propulsion performance under a chosen single operating condition, such as cruising at a particular speed or altitude. However, these mechanical control systems possess no means of adjusting control parameters such as gains and dynamic compensations for other speeds or altitudes of operation. Thus, the mechanical system does not operate at the most desirable performance over the entire flight envelope. The system is often overdamped or underdamped when not operating at the selected design condition.

DISCLOSURE OF INVENTION

An object of the present invention is to provide control of propeller speed to obtain stable, consistent propulsion performance over the entire flight envelope.

Another object of the present invention is to adjust control law gains and dynamic compensations within an aircraft propeller speed control as functions of propeller and engine dynamic characteristics over the entire flight envelope.

Still another object of the present invention is to provide for near optimal control stability and dynamic response across the entire range of operation of an aircraft propeller speed control.

According to a broadest aspect of the present invention, an aircraft propeller speed control defines values for propeller speed governing control law parameters, such as gains and dynamic compensations, based on known values of propeller and engine dynamic characteristics over the complete propeller operating envelope.

In further accord with this aspect of the present invention, a propeller speed rate feedback gain is scheduled as a function of predetermined flight conditions so that the dominant rotor lag, with rate feedback included, is essentially constant from idle to maximum power.

In still further accord with this aspect of the present invention, the governing gain and dynamic compensation lead are both scheduled as functions of predetermined flight conditions to provide relatively good stability and good dynamic response.

In still further accord with this aspect of the present invention, power anticipation gain is scheduled as a function of predetermined flight conditions to minimize propeller speed error resulting from changes in engine power.

In still further accord with this aspect of the present invention, propeller speed governing in one of three operating regimes—forward thrust, reverse thrust, inhibited governing—is scheduled as a function of predetermined flight conditions to identify three operating regimes.

The present invention has utility in the field of avionics. By providing means to adjust control law gains and dynamic compensations as functions of propeller and engine dynamic characteristics over the entire flight envelope, the present invention facilitates consistent response in an aircraft over the entire flight envelope. The merging technologies of integrating the propeller control laws into a full authority digital electronic engine control provides the flexibility for evolving aircraft propeller speed controls that are vastly improved in performance over prior art mechanical control systems. The flexibility permits control law parameters to be varied to optimize control stability and dynamic response over the range of operation.

These and other objects, features and advantages of the present invention will become more apparent in light of the detailed description of a best mode embodiment thereof, as illustrated in the accompanying drawings.

BEST MODE FOR CARRYING OUT THE INVENTION

Figure 1:
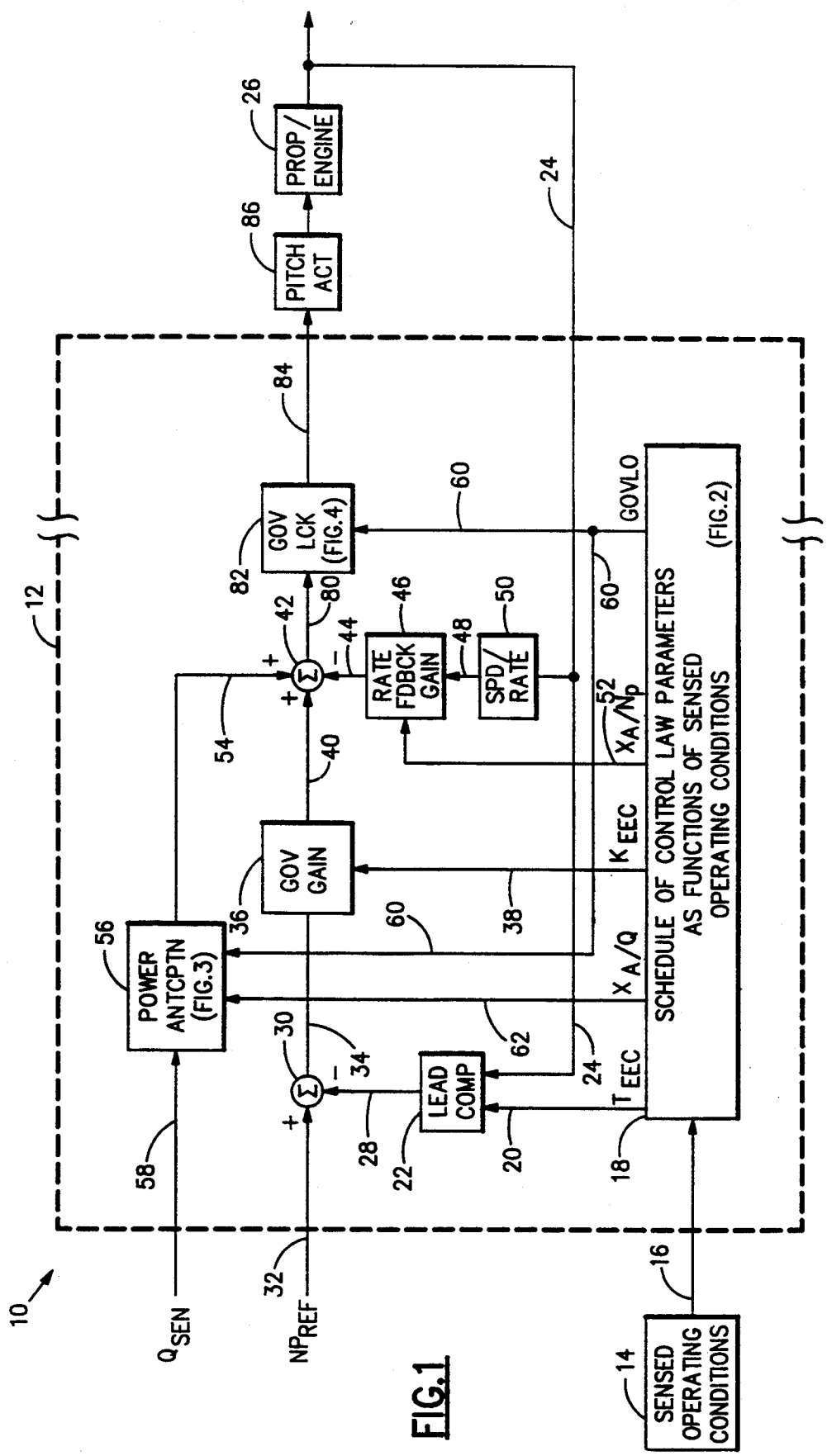
FIG. 1 is a block diagram illustration of a propeller control system in accordance with the present invention.
Figure 2:
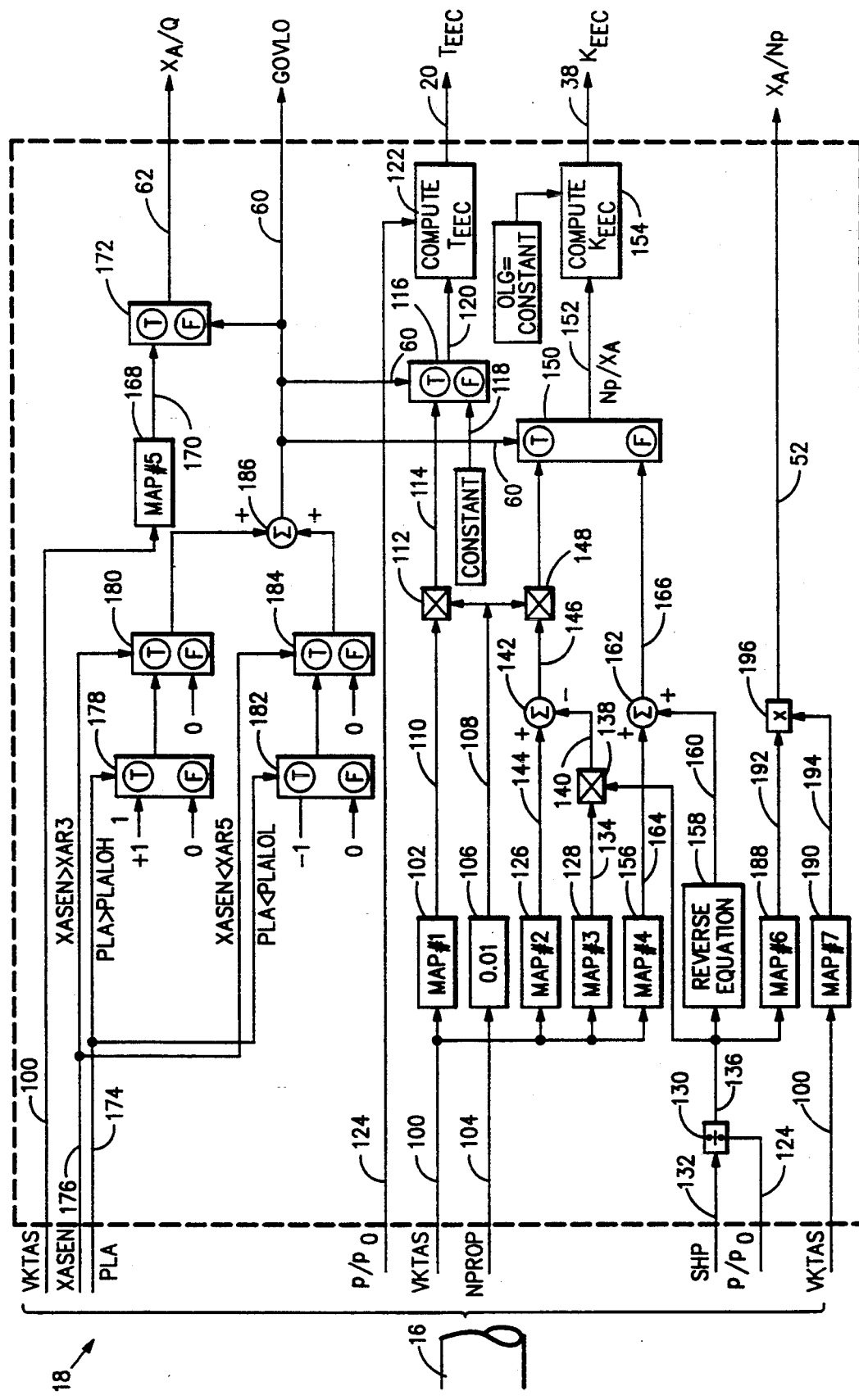
FIG. 2 is a block diagram illustration of a portion of the control laws in the control system of FIG. 1.

Referring to FIGS. 1 and 2, the present invention schedules propeller control law parameters in an aircraft propeller speed control 10 as a function of known values of environment plus propeller and engine dynamic characteristics. The exemplary control parameters are, e.g., a dynamic compensation lead ($T_{EEC}$), a governing gain ($K_{EEC}$), a power anticipation gain ($X_A/Q$), a propeller speed rate feedback gain ($X_A/NP$), and a governor lockout (GOVLO). The major component of the propeller control system is a full authority digital electronic engine control ("FADEC") 12. In the FADEC 12 are control laws 18 which schedule control law parameters as functions of sensed operating conditions 14. The sensed conditions 14 are provided on signal lines 16 to the control law schedules within the FADEC 12 from appropriate sensors 14 on the aircraft. The specific sensed conditions, along with the calculation of the control law parameters, are described in detail hereinafter with respect to FIG. 2.

The signal $T_{EEC}$ is provided on a line 20 from the control law schedules 18 to a lead compensation block 22, having the transfer function:

$$(T_{EEC}*S+1)/(T_0*S+1) \qquad (Eq.\ 1)$$

Also input to the lead compensation block 22 is a signal on a line 24 indicative of the actual speed of the propeller. The speed signal is a sensed signal provided from the propeller and engine 26.

The output signal of the lead compensation block is fed on a line 28 to a first summing junction 30. Also input to the junction is the operator commanded propeller speed signal ($NP_{REF}$) on a line 32. The junction 30 takes the difference between the two signals and provides the resulting signal on a line 34 to a governor gain block 36. The governor gain block 36 multiplies the speed difference signal with the value of the $K_{EEC}$ signal on a line 38 from the control law schedules 18.

The multiplied output signal from the governor gain block is fed on a line 40 to one input of a second summing junction 42. A second input to the junction 42 is a signal provided on a line 44 from a rate feedback gain block 46. This block 46 multiplies the rate of change of the actual propeller speed provided as a signal on a line 48 from a speed rate block 50 by the value of the propeller speed rate feedback gain signal, $X_A/NP$, provided on a line 52 from the control law schedules 18.

A third input to the second summing junction 42 is a signal provided on a line 54 from a power anticipation block 56. Input to this block is the sensed engine torque signal ($Q_{SEN}$) on a line 58, and the governor lockout signal (GOVLO) on a line 60 and power anticipation gain signal ($X_A/Q$) on a line 62 calculated by the control law schedules.

Figure 3:
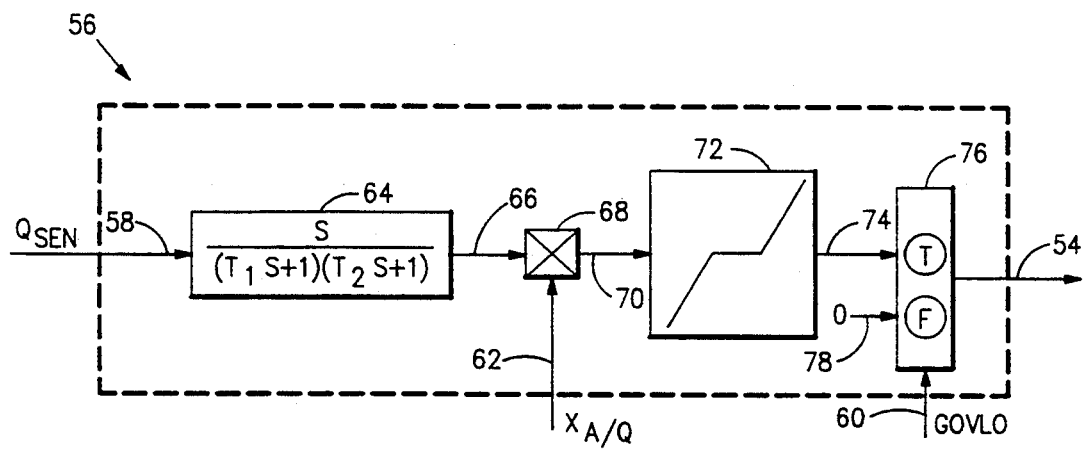
FIG. 3 is a block diagram illustration of a portion of the control laws in the control system of FIG. 1.

Referring to FIG. 3, therein is described the power anticipation gain block 56 in more detail. The sensed engine torque signal ($Q_{SEN}$) on the line 58 is fed to a block 64 having the transfer function:

$$(S)/(T_1*S+1)*(T_2*S+1) \quad \text{(Eq. 2)}$$

The output signal on a line 66 from the block 64 is fed to a multiplier 68, which multiplies this signal by the power anticipation gain signal ($X_{A/Q}$) on the line 62. The multiplied output signal on a line 70 is fed to a map 72. The output of the map 72 on a line 74 is fed to one input ("T") of a selector 76. The second input ("F") to the selector 76 on a line 78 is a constant having a value of zero. The selector chooses between its two inputs based on the level of the governor lockout signal (GOVLO) on the line 60. If GOVLO equals +1, the selector selects the map output signal on the line 74 to pass to the output of the selector on the line 54. GOVLO equal to +1 is indicative of propeller speed governing in the forward thrust regime. If GOVLO equals 0 or −1, the selector selects the constant of zero to pass to the selector output on the line 54. GOVLO equal to zero is indicative of propeller speed governing inhibited. GOVLO equal to −1 is indicative of propeller speed governing in the reverse thrust regime. The selector output is fed to the second summing junction 42 (FIG. 1).

Figure 4:
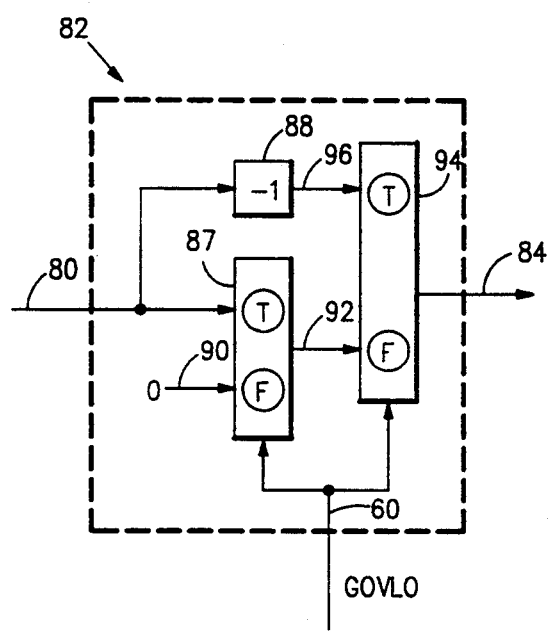
FIG. 4 is a block diagram illustration of a portion of the control laws in the control system of FIG. 1.

Referring back to FIG. 1, the output of the second summing junction 42 is indicative of the commanded pitch rate and is provided on a line 80 to a governor lockout logic block 82. This block 82 controls application of the commanded propeller pitch rate signal on a line 84 to the pitch actuator 86. The logic in the governor lockout block 82 is illustrated in more detail in FIG. 4. Therein the output signal on the line 80 from the second summing junction is fed to one input ("T") of a first selector 87, and is also fed to an inverter 88. A second input ("F") to the first selector 86 is a signal on a line 90 having a constant value equal to zero. The GOVLO signal is fed to the first selector. The first selector selects the output of the second summing junction to pass to the selector output on a line 92 when GOVLO equals +1. When GOVLO equals zero or −1, the constant equal to zero is passed to the output of the selector on the line 92.

The first selector output on the line 92 is fed to an input ("F") of a second selector 94. A second input ("T") to the second selector is the signal on a line 96 from the inverter 88. The GOVLO signal on the line 60 is fed to the second selector 94. The signal at the T input of the second selector is fed to the output of the second selector on the line 84 when GOVLO equals −1. The signal at the F input of the second selector is fed to the output of the second selector on the line 84 when GOVLO equals 0 or +1. The signal at the output of the second selector is the commanded propeller pitch rate signal fed to the pitch actuator 86 (FIG. 1).

Referring to FIG. 2, there illustrated in greater detail are the control law schedules 18 of FIG. 1. Signals indicative of sensed operating conditions input to the schedules include: true airspeed (VKTAS), pitch actuator position (XASEN), air density ratio ($P/P_0$; where "p" indicates the Greek letter rho), power lever angle (PLA), propeller speed (NPROP), and engine power (SHP).

The dynamic compensation lead ($T_{EEC}$) provides dynamic compensation for the dominant rotor lag time constant. Best control system dynamic performance is achieved when the dynamic compensation lead is equal in value to the dominant rotor lag. The present invention computes values for $T_{EEC}$ in both the forward thrust regime and reverse thrust regime, depending on the value of GOVLO. The computed value for $T_{EEC}$ is an approximation of the rotor lag time constant when operating at a constant percentage power, typically at maximum power.

In the forward thrust regime, $T_{EEC}$ is a function of air density ratio ($p/p_0$), true airspeed (VKTAS) and propeller speed (NPROP). VKTAS is fed on a line 100 to Map #1 102, which represents $T_{EEC}$ as a function of air speed (VKTAS). The values contained in Map #1 102 are dependent on the propeller that is to be used. The lead time constant is computed to cancel the rotor lag at a particular power condition, such as the highest possible. NPROP is fed on a line 104 to a multiplier 106. The multiplier 106 has a value of 0.01, which produces a percent propeller speed output signal on a line 108.

The map #1 output signal on a line 110 and percent propeller speed output signal are fed to a multiplier 112, whose output signal on a line 114 is fed to an input ("T") of a selector 116. A second input ("F") of the selector 116 is a signal on a line 118 having a constant value. The selector 116 chooses one input to pass through to a selector output on a line 120 depending on the value of GOVLO. If GOVLO equals +1 (i.e. forward thrust regime), the selector passes the T input signal to its output. If GOVLO equals 0 (governor inhibit) or −1 (i.e., reverse thrust regime), the selector passes the F input to its output. The selector output signal on the line 120 is fed to a logic block 122 which computes $T_{EEC}$ for both forward and reverse thrust regime operation by dividing the selector output signal by the air density ratio ($p/p_0$) on the line 124. The computed value for $T_{EEC}$ is provided on the line 20 for subsequent use as described hereinbefore in the control system 10 of FIG. 1.

The propeller governing gain ($K_{EEC}$) provides optimum dynamic response with satisfactory governor stability margin. For best dynamic performance, the governor open loop gain (OLG) is maintained at a predetermined constant value.

In the forward thrust regime the governing gain is a function of air density ratio (p/p₀), true airspeed (VKTAS), propeller speed (NPROP) and engine power (SHP). Map #2 126 works in conjunction with Map #3 128 to provide an estimate of the rotor gain for different operating conditions. Map #2 126 provides an intercept term to a straight line best fit approximation of the rotor gain as a function of true air speed. Map #3 128 provides a slope for a best fit straight line approximation of the rotor gain as a function of true air speed. Input to both Map #2 and Map #3 is the true air speed (VKTAS) signal on the line 100. An intermediate governing signal is formed in a division block 130 by dividing the engine power (SHP) signal on the line 132 by the air density ratio (p/p₀) signal on the line 124.

The Map #3 output signal on a line 134 and the intermediate governing signal on the line 136 are multiplied in a block 138, and the multiplied output signal on a line 140 is fed to a summing junction 142. Also input to the summing junction 142 is the Map #2 output signal on a line 144. The comparator takes the difference between the two signals and provides a signal on a line 146 indicative thereof. The comparator output signal is multiplied in a block 148 by the percent propeller speed signal on the line 108. The output of the multiplier 148 is fed to one input ("T") of a selector 150. The selector 150 is controlled by the GOVLO signal on the line 60 such that when GOVLO equals +1 (indicative of the forward thrust regime), the T input signal is passed to the selector output as a signal on a line 152 indicative of the plant gain, $N_P X_A$. This signal is fed to a block 154 which computes $K_{EEC}$ according to the following equation:

$$K_{EEC} = (OLG)/(N_P/X_A) \qquad (Eq. 3)$$

Thus, in the forward thrust regime, the open loop gain is divided by the plant gain to provide the propeller governing gain. Dividing by the plant gain yields a constant loop gain defined by OLG.

In the reverse thrust regime, the governing gain is a function of the air density ratio (p/p₀), true air speed (VKTAS), and engine power (SHP). Map #4 156 provides an estimate of the rotor gain as a function of true air speed. The output signal on the line 136 from the division block 130 is fed to a reverse equation block 158 which calculates a signal K1 according to the following equation:

$$K1 = (F_1) * (F_2 - (SHP/[P/P_0])) \qquad (Eq. 4)$$

where $F_1$ and $F_2$ are dependent on the particular engine and propeller. In an exemplary embodiment, $F_1$ equals 0.14, and $F_2$ equals 1900. The output signal on a line 160 from the reverse equation block is fed to a summing junction 162. Also fed to the junction is the output signal on a line 164 from Map #4 156. The output signal of the summing junction represents the plant gain for reverse thrust regime governing and is fed on a line 166 to a second input ("F") of the selector 150. When GOVLO equals '1 (reverse thrust regime), the selector passes the signal at its F input to the selector output on the line 152 to the compute $K_{EEC}$ block 154 which calculates $K_{EEC}$ according to Eq. 3 above.

Power anticipation adjusts propeller pitch in response to changes in engine torque or engine power. This minimizes transient speed variations resulting from changes in engine power. $X_A/Q$ is a function of true air speed (VKTAS). Map #5 168 provides an estimate of the power anticipation gain as a function of true air speed on the line 100. $X_A/Q$ is determined by analyzing the system torque response to changes in propeller actuator stroke. The output of Map #5 168 is fed as a signal on a line 170 to an input ("T") of a selector 172. A second input ("F") of the selector 172 is a constant equal to zero. The selector is controlled by the GOVLO signal on the line 60 to produce the power anticipation gain signal on the line 62 when GOVLO is +1 (forward thrust regime) and provides a zero signal on line 60 when GOVLO is 0 or −1.

For calculation of GOVLO, control logic is provided which discerns between three propeller speed operating regimes: forward thrust, reverse thrust, and governing inhibited. The regimes are indicated as GOVLO equal to +1, −1 and 0, respectively. GOVLO is determined as a function of the power lever angle (PLA) signal on a line 174 and the pitch actuator position (XASEN) signal on a line 176. If PLA commands a forward thrust (PLA>PLALOH) and the pitch actuator is in the forward thrust position (XASEN>XAR3), then governing in the forward thrust regime is permitted (GOVLO=+1). If PLA is less than PLALOL and XASEN is less than XAR5, then GOVLO=−1. PLALOH, PLALOL, XAR3 and XAR5 are constants whose values should be readily apparent to one of ordinary skill in the art. The aforedescribed GOVLO logic is implemented by four selectors 178,180,182,184 and summing junction 186 illustrated in FIG. 2.

Thus, if PLA commands reverse thrust and the pitch actuator is in the reverse thrust position, then governing in the reverse thrust regime is permitted. For transition between forward thrust and reverse thrust or propeller operation near flat pitch governing is inhibited, i.e., GOVLO=0.

The propeller rate feedback gain maintains the effective ROTOR lag at a constant value over the complete range OF power. Propeller speed rate feedback ($X_A/N_P$) is a function of SHP, p/p₀ and VKTAS. Map #6 188 works in conjunction with Map #7 190 to provide the rate feedback gain. Map #6 188 provides the scaling required to maintain the effective system lag fixed for power levels less than maximum. The output of Map #6 on a line 192 is zero at maximum power; i.e., the rate feedback path is eliminated. Map #7 accounts for the variation in the required rate feedback gain as a function of airspeed. The outputs of Map #6 and Map #7 are provided on signal lines 192,194 to a multiplier 196, which multiplies the two signals and provides the $X_A/N_P$ signal on the line 52.

It should be apparent to one of ordinary skill in the art that sensed operating conditions other than those described herein may be used in carrying out the teachings of the present invention. For example, measurement of ambient absolute pressure (P₀) and ambient absolute temperature (T₀) can provide an estimate of air density ratio (p/p₀), where:

$$P/P_0 = (constant) * (P_0/T_0) \qquad (Eq. 5)$$

Also, measurement of altitude can provide an estimate of air density ratio.

Measurement of indicated airspeed (VKIAS) and air density ratio (p/p₀) can provide an estimate of true air speed (VKTAS), where:

$$VKTAS = (VKIAS)/(p/p_0)^{\frac{1}{2}} \qquad (Eq. 6)$$

Thus, the sensed operating conditions described herein are purely exemplary and the broadest scope of the present invention is not limited to those conditions describe specifically herein. Also, the broadest scope of the present invention is not limited to those control law parameters described herein. It suffice for the broadest scope of the present invention that an aircraft propeller speed control defines values for propeller speed governing control law parameters, such as gains and dynamic compensations, based on known values of propeller and engine dynamic characteristics over the complete propeller operating envelope.

Although the invention has been illustrated and described with respect to a best mode embodiment thereof, it should be understood by those skilled in the art that the foregoing and various other changes, omissions, and additions in the form and detail thereof may be made without departing from the invention.

We claim:

1. A control system for controlling the speed of a propeller on an aircraft, comprising:
   means for sensing a plurality of operating conditions of the aircraft, and for providing a plurality of corresponding sensed signals indicative of the values of said operating conditions at a plurality of points within an entire operating range of the speed of the propeller, said means for sensing including means for sensing an actual value of the speed of the propeller and for providing an actual speed signal indicative thereof;
   means, responsive to said sensed signals, for providing variable values for each of one or more control law parameters as a direct function of said values of said operating conditions across said entire operating range of the speed of the propeller; and
   means, responsive to the variable values of each of the one or more control law parameters and the actual speed signal, for providing a signal indicative of a desired rate of change of a pitch position of the propeller, thereby controlling the propeller speed.

2. The control system of claim 1, wherein said one or more control law parameters includes a propeller speed rate feedback gain, said means for providing variable values comprising means for scheduling said propeller speed rate feedback gain as a function of said operating conditions such that a dominant rotor lag of the propeller is constant from idle to maximum power.

3. The control system of claim 2, wherein said operating conditions include the aircraft air density ratio, the true air speed of the aircraft, and the instantaneous engine power.

4. The control system of claim 1, wherein said one or more control law parameters includes a governing gain, said means for providing variable values comprising means for scheduling said governing gain as a function of said operating conditions.

5. The control system of claim 4, wherein said operating conditions include air density ratio, true airspeed, propeller speed and engine power.

6. The control system of claim 5, wherein said means for scheduling said governing gain as a function of said operating conditions comprises means for scheduling said governing gain in a forward thrust regime as a function of said air density ratio, said true airspeed, said propeller speed and said engine power.

7. The control system of claim 5, wherein said means for scheduling said governing gain as a function of said operating conditions comprises means for scheduling said governing gain in a reverse thrust regime as a function of said air density ratio, said true airspeed and said engine power.

8. The control system of claim 1, wherein said one or more control law parameters includes a dynamic compensation lead, said means for providing variable values comprising means for scheduling said dynamic compensation lead as a function of said operating conditions.

9. The control system of claim 8, wherein said operating conditions include true airspeed, air density ratio, and propeller speed.

10. The control system of claim 9, wherein said means for scheduling said dynamic compensation lead as a function of said operating conditions comprises means for scheduling said dynamic compensation lead in a forward thrust regime as a function of said true airspeed, said air density ratio, and said propeller speed.

11. The control system of claim 9, wherein said means for scheduling said dynamic compensation lead as a function of said operating conditions comprises means for scheduling said dynamic compensation lead in a reverse thrust regime as a function of said air density ratio.

12. The control system of claim 1, wherein said one or more control law parameters includes a power anticipation gain, said means for providing variable values comprising means for scheduling said propeller speed power anticipation gain as a function of said operating conditions so as to reduce any propeller speed error resulting from changes in engine power.

13. The control system of claim 12, wherein said operating conditions include engine power, air density ratio and true airspeed.

14. The control system of claim 13, wherein said means for scheduling said power anticipation gain as a function of said operating conditions comprises means for scheduling said power anticipation gain in a forward thrust regime as a function of said engine power, said air density ratio and said true airspeed.

15. The control system of claim 13, wherein said means for scheduling said power anticipation gain as a function of said operating conditions comprises means for inhibiting said power anticipation gain in a reverse thrust regime.

16. The control system of claim 1, wherein said one or more control law parameters includes an operating regime parameter, said means for providing variable values comprising means for scheduling said operating regime parameter as a function of said operating conditions.

17. The control system of claim 16, wherein said operating conditions include power lever angle and engine torque.

18. The control system of claim 16, wherein said operating regime parameter controls the operating range of the propeller speed in one of three regimes including forward thrust, reverse thrust, and speed governing inhibited.

* * * * *